(12) United States Patent
Nakagawa et al.

(10) Patent No.: US 10,594,177 B2
(45) Date of Patent: Mar. 17, 2020

(54) ROTARY ELECTRIC MACHINE AND ROTOR CORE MANUFACTURING METHOD

(71) Applicant: KABUSHIKI KAISHA YASKAWA DENKI, Kitakyushu-shi (JP)

(72) Inventors: Isao Nakagawa, Fukuoka (JP); Genki Urabe, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 513 days.

(21) Appl. No.: 15/291,068

(22) Filed: Oct. 12, 2016

(65) Prior Publication Data

US 2017/0104376 A1    Apr. 13, 2017

(30) Foreign Application Priority Data

Oct. 13, 2015 (JP) .................................. 2015-201826

(51) Int. Cl.
*H02K 1/27* (2006.01)
*H02K 15/03* (2006.01)
*H02K 29/03* (2006.01)

(52) U.S. Cl.
CPC ......... *H02K 1/2773* (2013.01); *H02K 1/2766* (2013.01); *H02K 15/03* (2013.01); *H02K 29/03* (2013.01); *H02K 2213/03* (2013.01)

(58) Field of Classification Search
CPC .... H02K 1/2773; H02K 1/2766; H02K 15/03; H02K 29/03; H02K 2213/03
See application file for complete search history.

(56) References Cited

U.S. PATENT DOCUMENTS

| 5,162,686 A * | 11/1992 | Royer ................. H02K 1/2773 310/156.59 |
| 6,917,133 B2 * | 7/2005 | Koharagi ............. H02K 1/2766 310/156.48 |
| 6,967,424 B2 * | 11/2005 | Popov .................... H02K 1/146 310/156.53 |

(Continued)

FOREIGN PATENT DOCUMENTS

| CN | 1976170 | 6/2007 |
| CN | 103166349 A | 6/2013 |

(Continued)

OTHER PUBLICATIONS

Chinese Office Action for corresponding CN Application No. 201610890403.7, dated Aug. 10, 2018.

(Continued)

*Primary Examiner* — Mohamad A Musleh
(74) *Attorney, Agent, or Firm* — Mori & Ward, LLP

(57) ABSTRACT

A rotary electric machine comprises a rotor core and a plurality of permanent magnets embedded in the rotor core along a circumferential direction of the rotor core. The rotor core includes a magnetic pole portion disposed between two permanent magnets adjoining along the circumferential direction of the rotor core. The magnetic pole portion includes a circular arc surface whose cross-sectional shape in a direction perpendicular to an axial direction of the rotor core is a circular arc shape differing in curvature from an outer circumferential circle which is a circumference of a maximum outer diameter portion of the rotor core.

12 Claims, 5 Drawing Sheets

(56) References Cited

U.S. PATENT DOCUMENTS

| | | | | |
|---|---|---|---|---|
| 7,521,832 B2* | 4/2009 | Tajima | ................ | H02K 1/2766 310/156.48 |
| 7,605,510 B2* | 10/2009 | Okuma | ................ | H02K 1/276 310/156.53 |
| 7,843,101 B2* | 11/2010 | Ito | ................ | H02K 1/2766 310/156.46 |
| 8,212,447 B2* | 7/2012 | Fukuda | ................ | H02K 1/276 310/156.53 |
| 2001/0028201 A1 | 10/2001 | Miyashita et al. | | |
| 2005/0200223 A1 | 9/2005 | Tajima et al. | | |
| 2006/0017345 A1* | 1/2006 | Uchida | ................ | H02K 1/2766 310/156.56 |
| 2007/0085436 A1* | 4/2007 | Tajima | ................ | H02K 1/2766 310/156.48 |
| 2007/0126305 A1 | 6/2007 | Okuma et al. | | |
| 2009/0251023 A1* | 10/2009 | Nakano | ................ | H02K 1/278 310/156.38 |
| 2011/0012465 A1* | 1/2011 | Kawamura | ............ | H02K 1/276 310/156.53 |
| 2014/0232230 A1 | 8/2014 | Yabe et al. | | |

FOREIGN PATENT DOCUMENTS

| | | |
|---|---|---|
| CN | 103650293 | 3/2014 |
| EP | 2602911 B1 | 9/2018 |
| JP | 2000-197292 | 7/2000 |
| JP | 2001-346368 | 12/2001 |
| JP | 2005-261024 | 9/2005 |
| JP | 2009-112166 | 5/2009 |

OTHER PUBLICATIONS

Korean Office Action issued in corresponding Korean Patent Application No. 10-2016-0132073, dated Mar. 13, 2019.

Japanese Office Action for corresponding JP Application No. 2015-201826, dated Oct. 16, 2018.

Chinese Office Action for corresponding Chinese Patent Application No. 201610890403.7, dated May 15, 2019.

* cited by examiner

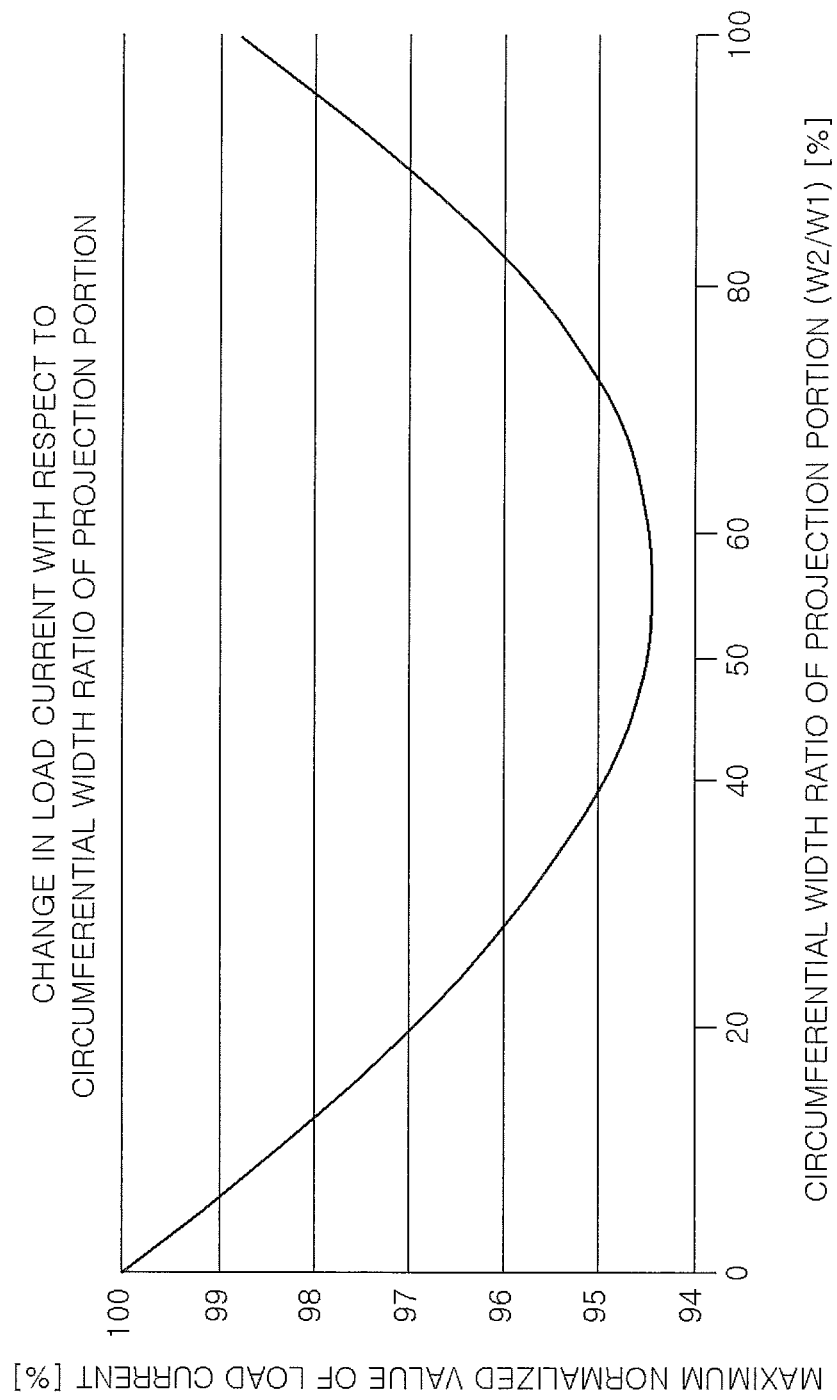

ROTARY ELECTRIC MACHINE AND
ROTOR CORE MANUFACTURING METHOD

CROSS-REFERENCE TO RELATED APPLICATION

The present disclosure contains subject matter related to that disclosed in Japanese Priority Patent Application No. 2015-201826 filed Japan Patent Office on Oct. 13, 2015. The contents of this application are incorporated herein by reference in their entirety.

BACKGROUND OF THE INVENTION

Field of the Invention

An embodiment of the present disclosure disclosed herein relates to a rotary electric machine and a rotor core manufacturing method.

Description of the Related Art

In Japanese Patent Application Publication No. 2009-112166, an electric motor is provided with a magnet-embedded rotor in which permanent magnets are embedded in a rotor core at predetermined intervals.

SUMMARY OF THE INVENTION

In the case of improving performance in the electric motor, it is required to further optimize the shape of a rotor core.

An embodiment of the present disclosure provides a rotary electric machine and a rotor core manufacturing method.

A rotary electric machine includes a rotor core and a plurality of permanent magnets embedded in the rotor core along a circumferential direction of the rotor core. The rotor core includes a magnetic pole portion disposed between two permanent magnets adjoining along the circumferential direction of the rotor core. The magnetic pole portion includes a circular arc surface. A cross-sectional shape of the circular arc surface in a direction perpendicular to an axial direction of the rotor core is a circular arc shape differing in curvature from an outer circumferential circle which is a circumference of a maximum outer diameter portion of the rotor core.

A method for manufacturing a rotor core of a rotary electric machine includes cutting out a plurality of circumferential points of an outer circumferential surface of a cylindrical rotor core to form a plurality of magnetic pole portions and to form a plurality of projection portions. Each of the magnetic pole portions has a circular arc surface differing in curvature from the outer circumferential surface and to form a plurality of projection portions. Each of the projection portions constitutes a portion of the outer circumferential surface, in uncut portions of the outer circumferential surface.

A rotary electric machine includes a rotor core, a plurality of permanent magnets embedded in the rotor core along a circumferential direction of the rotor core and a plurality of magnetic pole portions. The permanent magnets include plural pairs of permanent magnets each disposed in a V-like shape on a cross section perpendicular to an axial direction of the rotor core. An opening of the V-like shape is directed in a radial direction of the rotor core. Each of the magnetic pole portions is disposed within the V-like shape. Each of the magnetic pole portions includes a circular arc surface whose cross-sectional shape in a direction perpendicular to the axial direction is a circular arc shape having a curvature radius smaller than a radius of an outer circumferential circle which is a circumference of a maximum outer diameter portion of the rotor core.

BRIEF DESCRIPTION OF THE DRAWINGS

FIG. 5 is a view illustrating one example of a curve which represents a change in a load current with respect to a circumferential width ratio of a projection portion.

DESCRIPTION OF THE EMBODIMENTS

An embodiment of the present disclosure will now be with reference to the accompanying drawings.

<1. Overall Configuration of Rotary Electric Machine>

Figure 1:
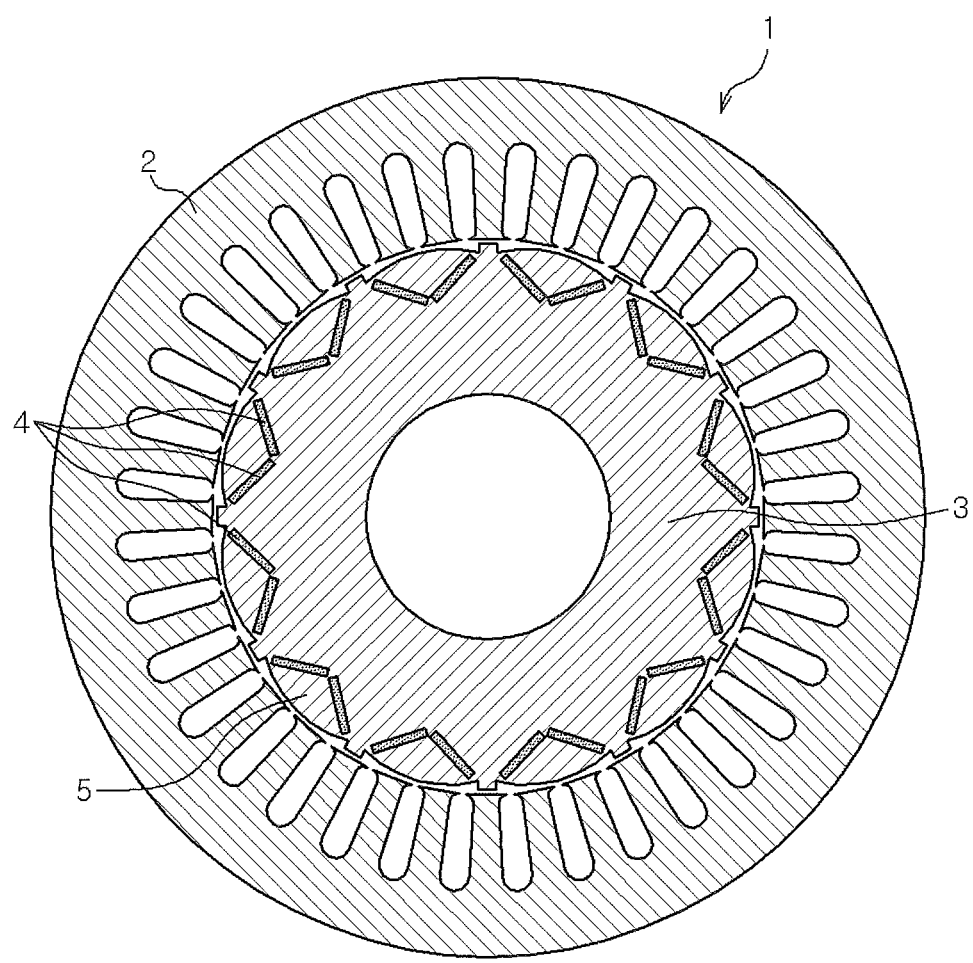
FIG. 1 is an enlarged sectional view illustrating one example of an overall configuration of a rotary electric machine according to an embodiment.

One example of an overall configuration of a rotary electric machine 1 according to the present embodiment will be described with reference to FIG. 1. In FIG. 1, the illustration of a frame, coils, a shaft and the like is omitted.

Referring to FIG. 1, the rotary electric machine 1 includes a stator core 2, a rotor core 3 and permanent magnets 4. The rotary electric machine may be used as a motor or may be used as a generator.

The stator core 2 is formed in a substantially cylindrical overall shape and is provided on an inner circumference of a cylindrical frame not shown. The rotor core 3 is formed in a substantially cylindrical overall shape. The rotor core 3 is fixed to an outer periphery of a shaft not shown and is disposed so as to radially face the inner circumferential surface of the stator core 2. Each of the stator core 2 and the rotor core 3 is formed by laminating substantially-annular thin electromagnetic steel plates in the axial direction of the shaft (in the direction orthogonal to the drawing sheet surface in FIG. 1).

In the example illustrated in FIG. 1, the stator core 2 is provided on its inner periphery with a plurality of (thirty six, in this example) teeth around which coils not shown are wound. The rotor core 3 is provided on its outer periphery with a plurality of (twelve, in this example) magnetic pole portions 5 formed at a plurality of points in the circumferential direction (rotation direction) due to the arrangement of a plurality of permanent magnets 4. In one example, the permanent magnets 4 are embedded in the rotor core 3 along the circumferential direction of the rotor core 3. Each of the magnetic pole portions 5 is disposed between two adjacent permanent magnets 4. Thus, the rotary electric machine 1 of the present embodiment has a configuration of so-called 12P36S (12-pole/36-slot) slot combination.

<2. Configuration of Each Magnetic Pole Portion of Rotor Core>

Figure 2:
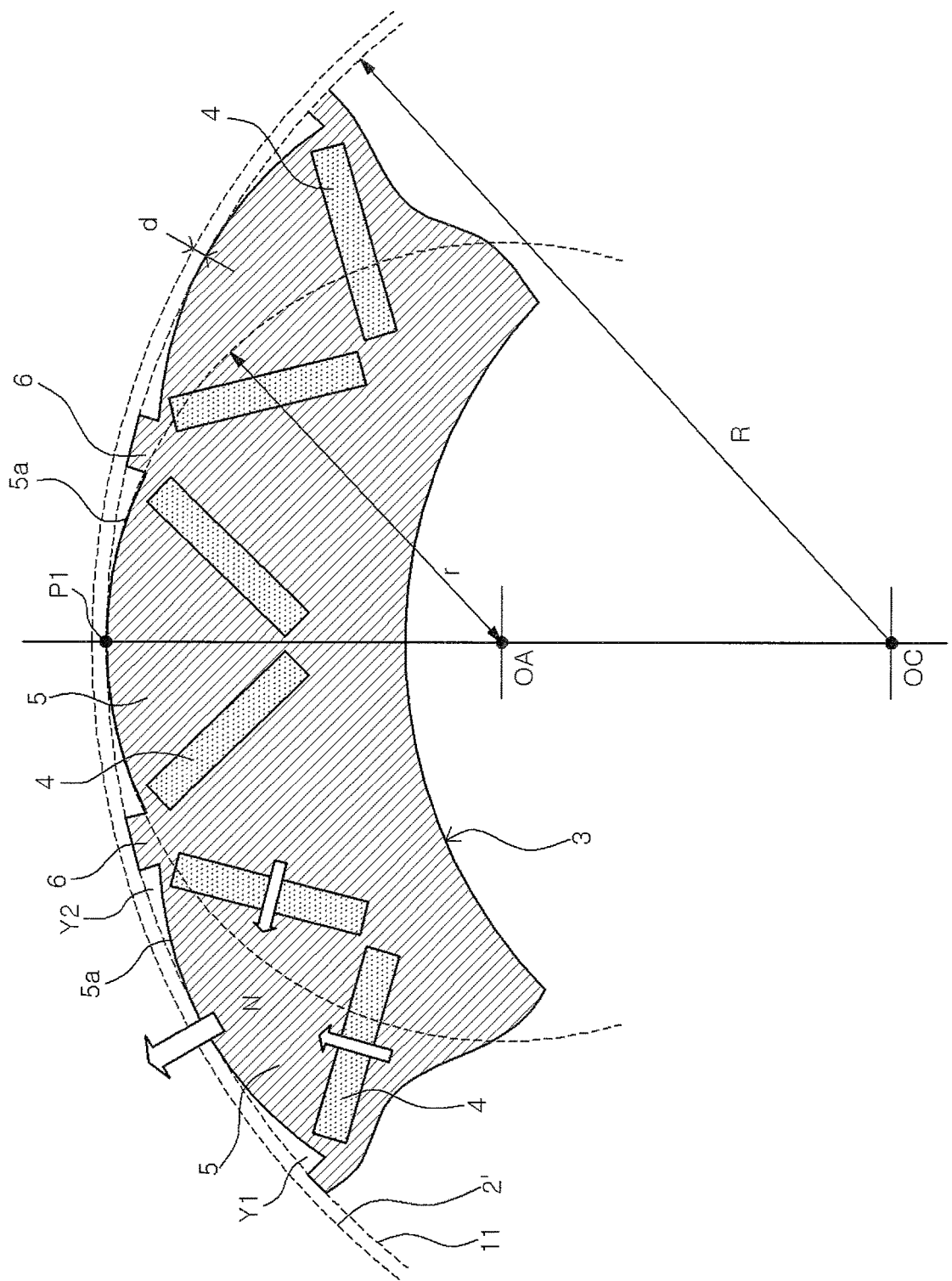
FIG. 2 is an enlarged sectional view illustrating one example of a configuration of three adjacent magnetic pole portions of a rotor core.

One example of the configuration of each of the magnetic pole portions 5 will be described with reference to FIG. 2. FIG. 2 is an enlarged sectional view illustrating three circumferentially-adjacent magnetic pole portions 5 of the rotor core 3. Referring to FIG. 2, each of the permanent magnets 4 is formed in, for example, a substantially rectangular shape on a cross section perpendicular to the axial direction (hereinafter referred to as an axis-orthogonal cross section). Plural pairs of permanent magnets 4 each disposed in a substantially V-like shape and opened toward the outer periphery of the rotor core 3 (in the radial direction) on the axis-orthogonal cross section are embedded in the outer periphery of the rotor core 3. That is to say, the rotor core 3 is of a so-called IPM (Internal Permanent Magnet) type. The region of the rotor core 3 sandwiched between one pair of the permanent magnets 4 disposed in a substantially V-like shape (the inner peripheral corner region of the V-shaped permanent magnets 4) corresponds to each of the magnetic pole portions 5. The V-like shape includes an arrangement in which two permanent magnets 4 are disposed so as not to become parallel to each other and so as not to make contact with each other. For example, an opening of the V-like shape may be directed in the radial direction of the rotor core 3.

In the outer peripheral surface of the rotor core 3 facing the stator core 2, the surface of the region sandwiched between one pair of permanent magnets 4 (the circular arc surface 5a to be described later) is often referred to as a magnetic pole portion. In the present embodiment, the magnetic pole portion includes the internal region sandwiched between one pair of permanent magnets 4, namely the radial inner region of the circular arc surface 5a.

One pair of permanent magnets 4 of each of the magnetic pole portions 5 is magnetized in such a magnetization direction that the magnetic fluxes face each other in the magnetic pole portion 5 of N pole but move away from each other in the magnetic pole portion 5 of S pole. For example, the magnetic pole portion 5 positioned at the left side in FIG. 2 is a magnetic pole portion of N pole because one pair of permanent magnets 4 is magnetized so that the magnetic fluxes face each other. The magnetic pole portions 5 are disposed at equal intervals in the circumferential direction so that the magnetic pole portions 5 adjoining in the circumferential direction have mutually-opposite polarities.

The term "equal intervals" does not have a strict meaning. Tolerances or errors in design and manufacture are permitted. In other words, the term "equal intervals" may have a meaning of "substantially equal intervals".

Each of the magnetic pole portions 5 includes a circular arc surface 5a whose shape on the axis-orthogonal cross section is a circular arc shape differing in curvature from an outer circumferential circle 11 which is a circumference of a largest outer diameter portion of the rotor core 3. Furthermore, the rotor core 3 includes a projection portion 6 formed between the adjacent magnetic pole portions 5 so that the circumferential width thereof has a predetermined dimension. Hereinafter, the circular arc surface 5a and the projection portion 6 will be sequentially described in detail.

<3. Circular Arc Surface of Each Magnetic Pole Portion>

Referring to FIG. 2, the outer circumferential circle is a circumference having a radius of R and having a center coinciding with a center OC positioned on a rotation axis of a shaft (not shown). The rotor core 3 is formed so that the largest outer diameter portion thereof is positioned on the outer circumferential circle 11 (namely, so that the largest outer diameter portion thereof inscribes the outer circumferential circle 11). That is to say, the largest outer diameter of the rotor core 3 is 2R. In FIG. 2, reference numeral 2' designates the circumference of an imaginary circle which interconnects the edges of the teeth of the stator core 2 oriented toward the center OC. Reference numeral 2' will be referred to as an inner circumferential circle of the stator core 2.

The circular arc surface 5a as the outer circumferential surface of each of the magnetic pole portions 5 is formed so that the shape thereof on the axis-orthogonal cross section becomes a circular arc shape having a curvature radius r smaller than the radius R of the outer circumferential circle 11 of the rotor core 3. On a straight line which interconnects the center OC and the circumferential center position P1 of each of the magnetic pole portions 5 (the center position of the circular arc surface 5a), the center OA of the circular arc shape is positioned radially inward by the curvature radius r from the center position P1.

The term "circle" used in the outer circumferential circle 11, the circular arc surface 5a or the like does not have a strict meaning. Tolerances or errors in design and manufacture are permitted. In other words, the term "circle" may have a meaning of "substantially circular".

In the rotor core 3, as described above, the curvature radius r of the circular arc surface 5a is set smaller than the radius R of the outer circumferential circle 11. Each of the magnetic pole portions 5 may be formed in a shape (so-called petal shape) so as to have inwardly-depressed recess portions Y1 and Y2 in the opposite side portions of the circular arc surface 5a. Furthermore, the circular arc surface 5a of each of the magnetic pole portions 5 is positioned on the outer circumferential circle 11 in the circumferential center position P1 of each of the magnetic pole portions 5. That is to say, each of the magnetic pole portions 5 inscribes the outer circumferential circle 11 in the center position P1 of the circular arc surface 5a. Thus, the distance of the gap d between the inner circumferential circle 2' of the stator core 2 and the rotor core 3 gradually increases from the circumferential center position P1 of each of the magnetic pole portions 5 toward the circumferential opposite sides of each of the magnetic pole portions 5. For example, the distance of the gap d between the inner circumferential circle 2' of the stator core 2 and the rotor core 3 is smallest in the center position P1 of the circular arc surface 5a of each of the magnetic pole portions 5. The magnetic flux density distribution may be changed by changing the distance of the gap d or the increase rate of the gap d (the curvature radius r). Accordingly, the cogging torque can be reduced by optimizing the size or increase rate of the gap d and approximating the magnetic flux density distribution to the form of a sine wave.

Figure 3:
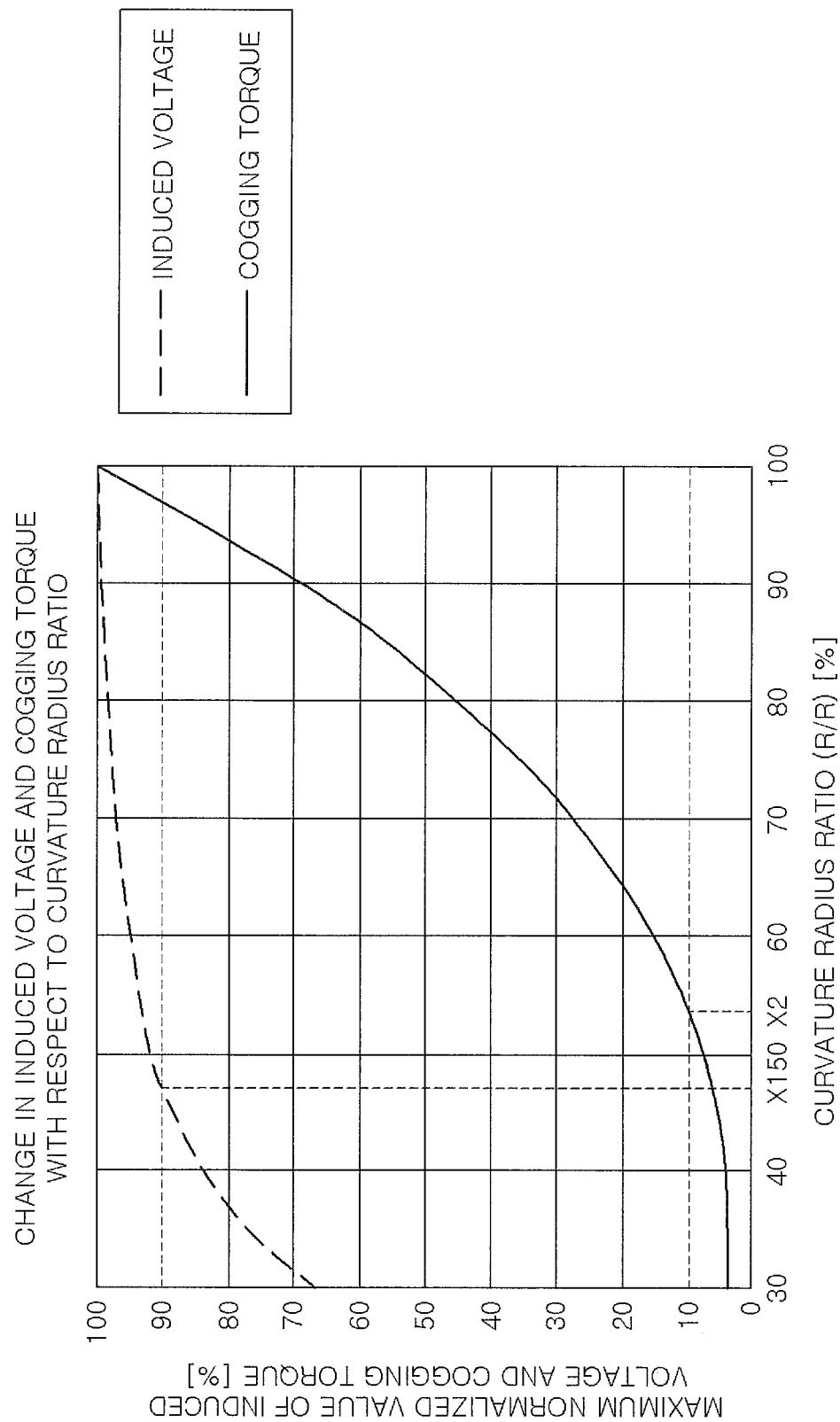
FIG. 3 is a view illustrating one example of a curve which represents a change in an induced voltage and a cogging torque with respect to a curvature radius ratio between an outer circumferential circle and a circular arc surface.

Next, descriptions will be made on one example of a method of setting the curvature radius r of the circular arc surface 5a. FIG. 3 illustrates one example of a curve which represents a change in an induced voltage and a cogging torque with respect to a curvature radius ratio between the outer circumferential circle 11 and the circular arc surface 5a. In FIG. 3, the horizontal axis corresponds to a ratio r/R of the curvature radius r of the circular arc surface 5a to the curvature radius R of the outer circumferential circle 11. Furthermore, the vertical axis corresponds to a numerical value which is indicated by normalizing the percentages of change values of an induced voltage and a cogging torque in the case where the maximum value available when the curvature radii of the outer circumferential circle 11 and the circular arc surface 5a are equal to each other (namely, when the ratio r/R is 100%) is assumed to be 1.

In the example illustrated in FIG. 3, the induced voltage and the cogging torque are changed to increase along with the increase of the curvature radius ratio r/R. The induced voltage is kept at a high value of about 90% or more when the curvature radius ratio r/R is about 50% or more. In contrast, the cogging torque tends to sharply decrease if the curvature radius ratio r/R is reduced even a little bit from 100%.

When designing a typical rotary electric machine 1, in view of the characteristics of the rotary electric machine 1, it is preferred that the induced voltage is set at a high value as far as possible (for example, at about 90% or more) without reducing the induced voltage. The cogging torque is the pulsation of a torque caused by the rotation of the rotor (rotor core 3). In the rotary electric machine 1, if the cogging torque is large, there is a possibility that the smooth rotation of the rotor is inhibited and the efficiency and the accuracy of rotation control are reduced. In addition, the cogging torque may be a cause of noise or vibration. For that reason, it is desirable that the cogging torque be kept at a small vale as far as possible (for example, at about 10% or less). In view of the foregoing, in the example illustrated in FIG. 3, it is desirable that the curvature radius ratio r/R of the circular arc surface 5*a* to the outer circumferential circle 11 be set at a value between the minimum value X1 and the maximum value X2 (at 50% or so). In the present embodiment, as illustrated in FIG. 2, the curvature radius r of the circular arc surface 5*a* is set to become about 50% of the radius R of the outer circumferential circle 11.

<4. Projection Portion of Each Magnetic Pole Portion>

Figure 4:
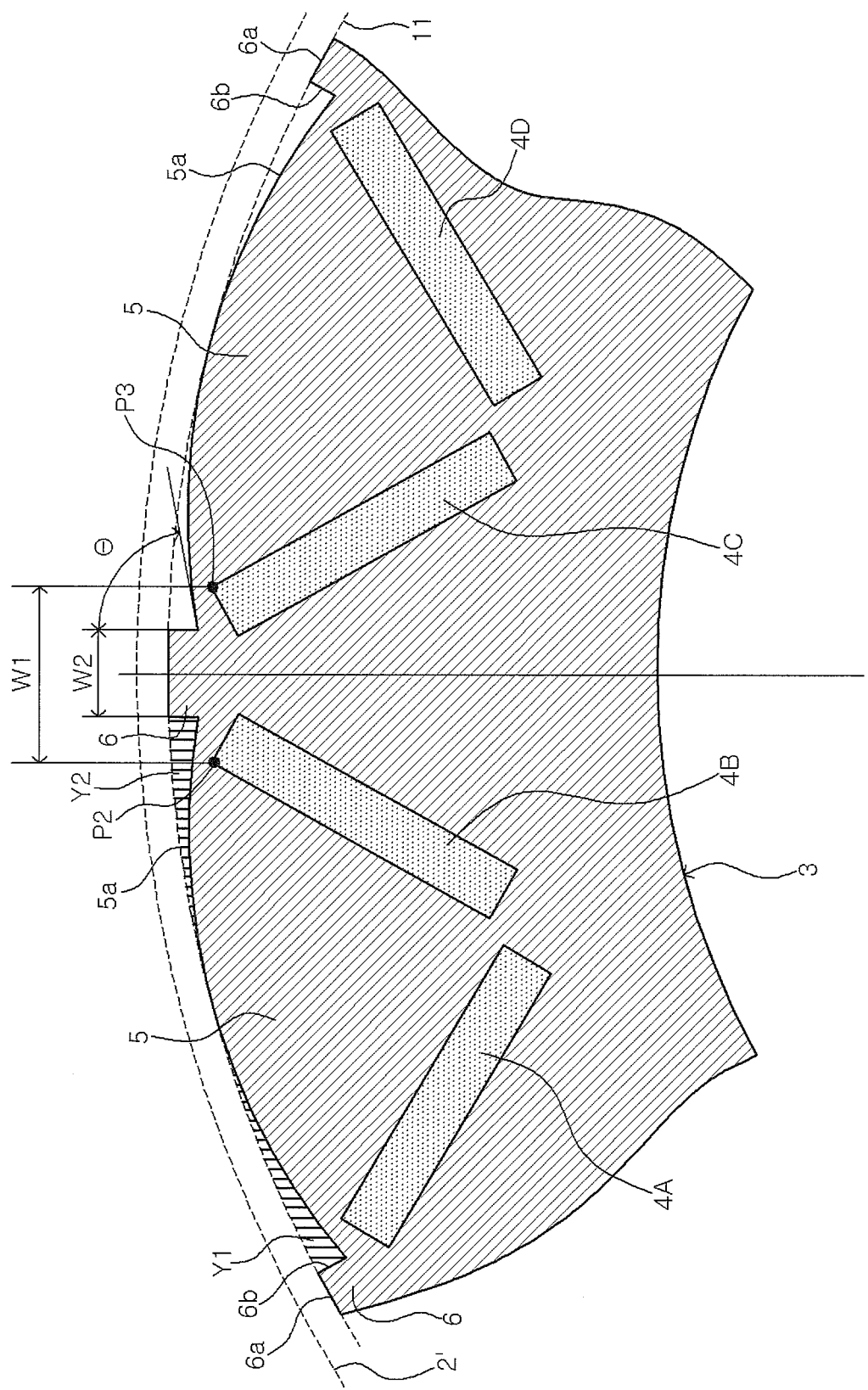
FIG. 4 is an enlarged sectional view illustrating one example of a configuration of one projection portion positioned between two magnetic pole portions.

FIG. 4 illustrates one projection portion 6 positioned between two magnetic pole portions 5 on an enlarged scale. Referring to FIG. 4, the rotor core 3 includes a plurality of projection portions 6 each positioned between the circumferentially-adjacent magnetic pole portions 5. For example, the rotor core 3 includes a projection portion 6 positioned between two adjacent magnetic pole portions 5. The projection portion 6 protrudes radially outward with respect to the circular arc surface 5*a* from an intermediate position between the magnetic pole portions 5. At least a portion of the outer-periphery-side surface 6*a* of the projection portion 6 is positioned on the outer circumferential circle 11. For example, the outer-periphery-side surface 6*a* of the projection portion 6 may have the same curvature as the circumference of the outer circumferential circle 11. Thus, the outer-periphery-side surface 6*a* may coincide with a portion of the outer circumferential circle 11.

Each of the projection portions 6 includes side surfaces 6*b* provided at the circumferential opposite sides thereof so that the angle θ between each of the side surfaces 6*b* and the circular arc surface 5*a* becomes an acute angle. Thus, each of the projection portions 6 is formed so that the shape thereof on the axis-orthogonal cross section becomes a substantially rectangular shape. For example, each of the projection portions 6 includes a side surface 6*b*. The angle between the side surface 6*b* and the tangential line of the circular arc surface 5*a* at the point where the side surface 6*b* and the circular arc surface 5*a* meet with each other may be an acute angle. The cross-sectional shape of each of the projection portions 6 may be, for example, a trapezoidal shape or a circular arc shape as well as the aforementioned rectangular shape.

In the circumferential direction, each of the projection portions 6 is disposed between one pair of permanent magnets 4A and 4B and another pair of permanent magnets 4C and 4D adjoining each other in the circumferential direction. Specifically, each of the projection portions 6 is disposed so that the circumferential position thereof lies between a corner portion P2 (first corner portion) of one permanent magnet 4B positioned at the outermost side (closest to the outer circumferential circle 11) and a corner portion P3 (second corner portion) of the other permanent magnet 4C positioned at the outermost side (closest to the outer circumferential circle 11). The circumferential width W2 of each of the projection portions 6 (the width of the outer-periphery-side surface 6*a*) is set to have a predetermined percentage with respect to the circumferential distance W2 between the corner portion P2 (first corner portion) of one permanent magnet 4B and the corner portion P3 (second corner portion) of the other permanent magnet 4C.

Next, descriptions will be made on one example of a method of setting the circumferential width W2 of each of the projection portions 6. FIG. 5 illustrates one example of a curve which represents a change in a load current with respect to a circumferential width ratio of each of the projection portions. In FIG. 5, the horizontal axis corresponds to a ratio W2/W1 of the circumferential width W2 of each of the projection portions 6 to the distance W1 between the corner portions P2 and P3. The vertical axis corresponds to a numerical value which is indicated by normalizing the percentage of a change value of a load current flowing under the same load in the case where the maximum value available when the projection portions 6 are not provided (namely, when the ratio W2/W1 is 0%) is assumed to be 1.

In the example illustrated in FIG. 5, the load current has a minimum value in the case where the circumferential width ratio W2/W1 of each of the projection portions 6 is about 55%. The load current is changed to increase as the circumferential width ratio W2/W1 of each of the projection portions 6 increases from about 55%. The parabolic curve-like change in the load current is caused by the change in a reluctance torque and a leaked magnetic flux amount.

The term "reluctance torque" used herein refers to a torque which is generated a circumferential component force of an attraction force and a repulsion force radially applied from the magnetic flux of the stator core 2 to each of the magnetic pole portions 5. In the case where the rotor core 3 is formed in a petal shape (r<R) as described above, if the circumferential width ratio W2/W1 of each of the projection portions 6 is set to become small, the saliency ratio of inductance in each of the magnetic pole portions 5 is reduced and the reluctance torque is reduced. Thus, the electric current (load current) flowing through the rotary electric machine 1 under the same load condition is increased and the loss is increased (the efficiency is reduced).

On the other hand, if the circumferential width ratio W2/W1 of each of the projection portions 6 is set to become large, even when the rotor core 3 is formed in a petal shape (r<R) as described above, it is possible to increase the q-axis magnetic flux and to increase the saliency ratio and the reluctance torque. However, if the circumferential width ratio W2/W1 of each of the projection portions 6 is set to become too large, the magnetic flux amount leaked through between each of the projection portions 6 and each of the magnetic pole portions 5 is increased and the magnet torque is reduced (the load current is increased and the efficiency is reduced).

In view of the foregoing, in the example illustrated in FIG. 5, it is desirable that the circumferential width ratio W2/W1 of each of the projection portions 6 be set at about 50% to about 60%. This is because, in this range, the parabolic curve-like change in the load current becomes close to a minimum value. This makes it possible to optimize the width W2 of each of the projection portions 6 so that the combined torque of the magnet torque and the reluctance torque is maximized and so that the load current is minimized. In the present embodiment, as illustrated in FIG. 4, the circumferential width ratio W2/W1 of each of the projection portions 6 is set at about 55%.

<5. Rotor Core Manufacturing Method>

One example of a method for manufacturing the rotor core 3 having the external shape described above will now be described. For example, it is conceivable to cut out, in a circular arc shape, a plurality of circumferential points of the outer circumferential surface of a cylindrical rotor core having a radius R (the outer circumferential surface having the same axis-orthogonal cross section shape as the outer circumferential circle 11) (In other words, it is conceivable to form recess portions having a circular arc shape). In this case, the cutout portions (recess portions) Y1 and Y2 to be cut out are hatched in FIG. 4. Thus, it is possible to form magnetic pole portions 5 each including a circular arc surface 5a cut out in a circular arc shape so as to have a curvature differing from that of the outer circumferential surface. It is also possible to form a plurality of projection portions 6, which constitutes a portion of the outer circumferential surface, in the uncut regions between the magnetic pole portions 5.

Specifically, for example, the regions corresponding to the cutout portions Y1 and Y2 are removed from the circular outer periphery of each of thin electromagnetic steel plates constituting the rotor core 3 by, for example, punching or the like. The rotor core 3 is manufactured by axially laminating the punched thin electromagnetic steel plates.

<6. Effects of the Present Embodiment>

As described above, according to the rotary electric machine 1 of the present embodiment, each of the magnetic pole portions 5 of the rotor core 3 includes the circular arc surface 5a whose shape on the axis-orthogonal cross section is a circular arc shape differing in curvature from the outer circumferential circle 11 of the rotor core 3. This makes it possible to optimize the size of the gap d between the rotor core 3 and the stator core 2, thereby approximating the magnetic flux density distribution to the shape of a sine wave and reducing the cogging torque. As a result, it is possible to improve the efficiency and the accuracy of rotation control and to reduce a noise and a vibration. Accordingly, the performance of the rotary electric machine 1 is improved.

Furthermore, in the present embodiment, particularly, the curvature radius r of the circular arc surface 5a of each of the magnetic pole portions 5 is set smaller than the radius R of the outer circumferential circle 11 of the rotor core 3. Thus, the rotor core 3 can be formed in an inwardly-depressed shape between the magnetic pole portions bulging toward the outer periphery. As a result, the distance of the gap d between the rotor core 3 and the stator core 2 can be optimized by reducing the distance of the gap d in each of the magnetic pole portions 5 and increasing the distance of the gap d between the magnetic pole portions 5. It is therefore possible to reducing the cogging torque.

Furthermore, in the present embodiment, particularly, the ratio r/R of the curvature radius r to the radius R is set such that, as compared with a case where the curvature radius r and the radius R are equal to each other, the cogging torque is reduced to a predetermined percentage (e.g., 10%) or less and the reduction of the induced voltage falls within a predetermined percentage (e.g., 10%). This makes it possible to significantly reduce the cogging torque while suppressing the reduction of the induced voltage. It is therefore possible to improve the performance of the rotary electric machine 1.

Furthermore, in the present embodiment, particularly, the circular arc surface 5a of each of the magnetic pole portions 5 is positioned on the outer circumferential circle 11 in the circumferential center position P1 of each of the magnetic pole portions 5. Thus, the size of the gap d between the rotor core 3 and the stator core 2 can be optimized by minimizing the size of the gap d in the circumferential center position P1 of each of the magnetic pole portions 5 and gradually increasing the size of the gap d toward the circumferential opposite sides of each of the magnetic pole portions 5. It is therefore possible to enhance the effect of reducing the cogging torque.

Furthermore, in the present embodiment, particularly, the rotor core 3 includes the projection portions 6 provided between the magnetic pole portions 5 so that the outer-periphery-side surface 6a of each of the projection portions 6 is positioned on the outer circumferential circle 11. This makes it possible to increase the q-axis magnetic fluxes and to increase the saliency ratio. It is therefore possible to suppress the reduction of the efficiency.

Furthermore, in the present embodiment, particularly, each of the projection portions 6 includes the side surfaces 6b provided at the circumferential opposite sides of each of the projection portions 6 so that the angle 19 between each of the side surfaces 6b and the circular arc surface 5a of each of the magnetic pole portions 5 becomes an acute angle. This makes it possible to form the cross-sectional shape of each of the projection portions 6 in a substantially rectangular shape. It is therefore possible to accurately set the width of each of the projection portions 6. In addition, as compared with a case where each of the projection portions 6 is formed in a trapezoidal shape, it is possible to reduce the possibility that the amount of magnetic fluxes leaked through between the projection portions 6 and the outer-periphery-side end portions of the permanent magnets 4 is increased.

Furthermore, in the present embodiment, particularly, the permanent magnets 4 are disposed in a V-like shape. This makes it possible to enhance the effect of concentrating the magnetic fluxes in each of the magnetic pole portions 5 and to increase the magnet torque. Moreover, each of the projection portions 6 is disposed between the outermost corner portions P2 of one permanent magnet 4B and the outermost corner portion P3 of another permanent magnet 4C. This makes it possible to reduce the gap between the corner portions P2 and P3 of the permanent magnets 4B and 4C and the circular arc surface 5a of each of the magnetic pole portions 5. It is therefore possible to reduce the amount of the magnetic fluxes leaked in the vicinity of the corner portions P2 and P3 of the permanent magnets 4B and 4C.

Furthermore, in the present embodiment, particularly, each of the projection portions 6 is formed such that, if the circumferential distance W1 between the corner portion P2 of one permanent magnet 4B and the corner portion P3 of another permanent magnet 4C is assumed to be 100%, the circumferential width W2 of each of the projection portions 6 becomes from 50% to 60%. This makes it possible to optimize the width W2 of each of the projection portions 6 so that the combined torque of the magnet torque and the reluctance torque is maximized and so that the load current is minimized.

Furthermore, the rotor core 3 is manufactured by cutting out the outer circumferential surface of a cylindrical rotor core to form a plurality of circular arc surfaces 5a and by leaving the uncut regions to form a plurality of projection portions 6 between the circular arc surfaces 5a. According to the manufacturing method of the rotor core 3, it is possible to facilitate the manufacture of the rotor core 3.

In the foregoing descriptions, if there are expressions such as "perpendicular", "parallel" and "planar", such expressions do not have strict meanings. That is to say, the expressions such as "perpendicular", "parallel" and "planar" are intended to permit a tolerance or an error in design or manufacture and may have meanings of "substantially perpendicular", "substantially parallel" and "substantially planar".

Furthermore, in the foregoing descriptions, if there are expressions such as "the same" and "equal" in the external dimension or size, such expressions do not have strict meanings. That is to say, the expressions such as "the same" and "equal" are intended to permit a tolerance or an error in design or manufacture and may have meanings of "substantially the same" and "substantially equal".

In addition to the foregoing descriptions, the methods according to the above-described embodiments and modifications may be used in combination. While not illustrated one by one, the above-described embodiments and modifications can be modified in many different forms without departing from the spirit of the present disclosure.

What is claimed is:

1. A rotary electric machine, comprising:
    a rotor core; and
    a plurality of permanent magnets embedded in the rotor core along a circumferential direction of the rotor core,
    wherein the rotor core includes a plurality of magnetic pole portions, each of the magnetic pole portions being disposed between two permanent magnets adjoining along the circumferential direction of the rotor core, and
    the magnetic pole portion includes a circular arc surface whose cross-sectional shape in a direction perpendicular to an axial direction of the rotor core is a circular arc shape differing in curvature from an outer circumferential circle which is a circumference of a maximum outer diameter portion of the rotor core, and the magnetic pole portion is configured to inscribe the outer circumferential circle in a center position of the circular arc surface, and
    the rotor core further includes a plurality of projection portions, each of the projection portions being positioned between two adjacent magnetic pole portions, and at least a portion of an outer-periphery-side surface of the projection portion is positioned on the outer circumferential circle.

2. The machine of claim 1, wherein a curvature radius of the circular arc surface of the magnetic pole portion is smaller than a radius of the outer circumferential circle of the rotor core.

3. The machine of claim 2, wherein the two permanent magnets adjoining along the circumferential direction of the rotor core are disposed in a V-like shape in a cross section perpendicular to the axial direction, an opening of the V-like shape being directed in a radial direction of the rotor core,
    the plurality of permanent magnets includes plural pairs of the permanent magnets disposed in the V-like shape, and
    the outer-periphery-side surface of the projection portion is disposed between one pair of permanent magnets and another pair of permanent magnets adjoining each other and is disposed between a first corner portion of one permanent magnet of one pair of permanent magnets positioned closest to the outer circumferential circle and a second corner portion of one permanent magnet of another pair of permanent magnets positioned closest to the outer circumferential circle and opposed to one permanent magnet of one pair of permanent magnets.

4. The machine of claim 3, wherein the projection portion is formed such that, if the circumferential distance between the first corner portion and the second corner portion is assumed to be 100%, the width of the outer-periphery-side surface of the projection portion becomes 50% to 60%.

5. The machine of claim 2, wherein the projection portion includes a side surface, and an angle between the side surface and a tangential line of the circular arc surface at a point where the side surface and the circular arc surface meet with each other is an acute angle.

6. The machine of claim 2, wherein a ratio of the curvature radius to the radius of the outer circumferential circle is set to about 50% such that, as compared with a case where the curvature radius and the radius of the outer circumferential circle are equal to each other, a cogging torque is kept at 10% or less and an induced voltage is kept at 90% or more.

7. The machine of claim 6, wherein the projection portion includes a side surface, and an angle between the side surface and a tangential line of the circular arc surface at a point where the side surface and the circular arc surface meet with each other is an acute angle.

8. The machine of claim 6, wherein the two permanent magnets adjoining along the circumferential direction of the rotor core are disposed in a V-like shape in a cross section perpendicular to the axial direction, an opening of the V-like shape being directed in a radial direction of the rotor core,
    the plurality of permanent magnets includes plural pairs of the permanent magnets disposed in the V-like shape, and
    the outer-periphery-side surface of the projection portion is disposed between one pair of permanent magnets and another pair of permanent magnets adjoining each other and is disposed between a first corner portion of one permanent magnet of one pair of permanent magnets positioned closest to the outer circumferential circle and a second corner portion of one permanent magnet of another pair of permanent magnets positioned closest to the outer circumferential circle and opposed to one permanent magnet of one pair of permanent magnets.

9. The machine of claim 1, wherein the projection portion includes a side surface, and
    an angle between the side surface and a tangential line of the circular arc surface at a point where the side surface and the circular arc surface meet with each other is an acute angle.

10. The machine of claim 9, wherein the two permanent magnets adjoining along the circumferential direction of the rotor core are disposed in a V-like shape in a cross section perpendicular to the axial direction, an opening of the V-like shape being directed in a radial direction of the rotor core,
    the plurality of permanent magnets includes plural pairs of the permanent magnets disposed in the V-like shape, and
    the outer-periphery-side surface of the projection portion is disposed between one pair of permanent magnets and another pair of permanent magnets adjoining each other and is disposed between a first corner portion of one permanent magnet of one pair of permanent magnets positioned closest to the outer circumferential circle and a second corner portion of one permanent magnet of another pair of permanent magnets positioned closest to the outer circumferential circle and opposed to one permanent magnet of one pair of permanent magnets.

11. The machine of claim 1, wherein the two permanent magnets adjoining along the circumferential direction of the rotor core are disposed in a V-like shape in a cross section perpendicular to the axial direction, an opening of the V-like shape being directed in a radial direction of the rotor core, the plurality of permanent magnets includes plural pairs of the permanent magnets disposed in the V-like shape, and the outer-periphery-side surface of the projection portion is disposed between one pair of permanent magnets and another pair of permanent magnets adjoining each other and is disposed between a first corner portion of one permanent magnet of one pair of permanent magnets positioned closest to the outer circumferential circle and a second corner portion of one permanent magnet of another pair of permanent magnets positioned closest to the outer circumferential circle and opposed to one permanent magnet of one pair of permanent magnets.

12. The machine of claim 11, wherein the projection portion is formed such that, if the circumferential distance between the first corner portion and the second corner portion is assumed to be 100%, the width of the outer-periphery-side surface of the projection portion becomes 50% to 60%.

* * * * *